United States Patent
Aylwin et al.

(10) Patent No.: US 11,953,327 B2
(45) Date of Patent: Apr. 9, 2024

(54) ROUTE PROVISIONING THROUGH MAP MATCHING FOR AUTONOMOUS DRIVING

(71) Applicant: FCA US LLC, Auburn Hills, MI (US)

(72) Inventors: Keith Aylwin, San Diego, CA (US); Luke Armbruster, Aurora, IN (US); Balachander Rajakondala, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 114 days.

(21) Appl. No.: 17/343,003

(22) Filed: Jun. 9, 2021

(65) Prior Publication Data

US 2022/0397401 A1 Dec. 15, 2022

(51) Int. Cl.
*G01C 21/32* (2006.01)
*G01C 21/00* (2006.01)
*G01C 21/34* (2006.01)

(52) U.S. Cl.
CPC ......... *G01C 21/32* (2013.01); *G01C 21/3461* (2013.01); *G01C 21/387* (2020.08)

(58) Field of Classification Search
CPC .. G01C 21/32; G01C 21/3461; G01C 21/387; G01C 21/3446; G01C 21/3484; G01C 21/30
See application file for complete search history.

(56) References Cited

U.S. PATENT DOCUMENTS

| | | | |
|---|---|---|---|
| 5,919,246 A | 7/1999 | Waizmann et al. | |
| 6,175,870 B1* | 1/2001 | Gawlick | H04Q 11/0478 709/227 |
| 6,735,515 B2 | 5/2004 | Bechtolsheim et al. | |
| 8,284,995 B2 | 10/2012 | Diaz et al. | |
| 9,423,260 B2 | 8/2016 | Stählin | |
| 2011/0141918 A1* | 6/2011 | Li | H04J 7/00 370/252 |
| 2012/0016576 A1 | 1/2012 | Huang et al. | |
| 2017/0276502 A1* | 9/2017 | Fischer | G01C 21/3614 |
| 2022/0381569 A1* | 12/2022 | Khan | G01C 21/3446 |

FOREIGN PATENT DOCUMENTS

| | | |
|---|---|---|
| CN | 106500727 A | 3/2017 |
| WO | 2019207160 A1 | 10/2019 |

OTHER PUBLICATIONS

International Search Report and Written Opinion for International Application No. PCT/2022/032594, International Filing Date Jun. 8, 2022.

* cited by examiner

*Primary Examiner* — Rami Khatib
(74) *Attorney, Agent, or Firm* — Jeremy J. Klobucar

(57) ABSTRACT

Route provisioning techniques for an autonomous driving feature of a vehicle include receiving a user-generated route generated by a user using a second map database that differs from a first map database of the vehicle that stores a road graph specifying nodes and links representative of a map of roads proximate to the vehicle and specifies an array of geo-points between a current geo-location of the vehicle and a final geo-location for the vehicle, determining, using the road graph maintained by the first map database, a set of valid routes from the current geo-location to the final geo-location ordered based on relative likelihood, determining a best route from the set of valid routes based on a weighted comparison between each route of the set of valid routes and the user-generated route, and utilizing the selected route for control of the autonomous driving feature.

20 Claims, 4 Drawing Sheets

Route Selecting

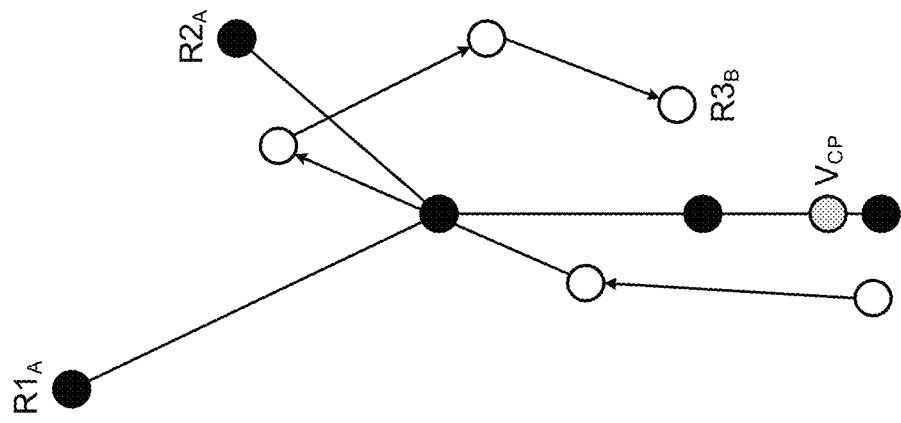
FIG. 2C Invalid Route
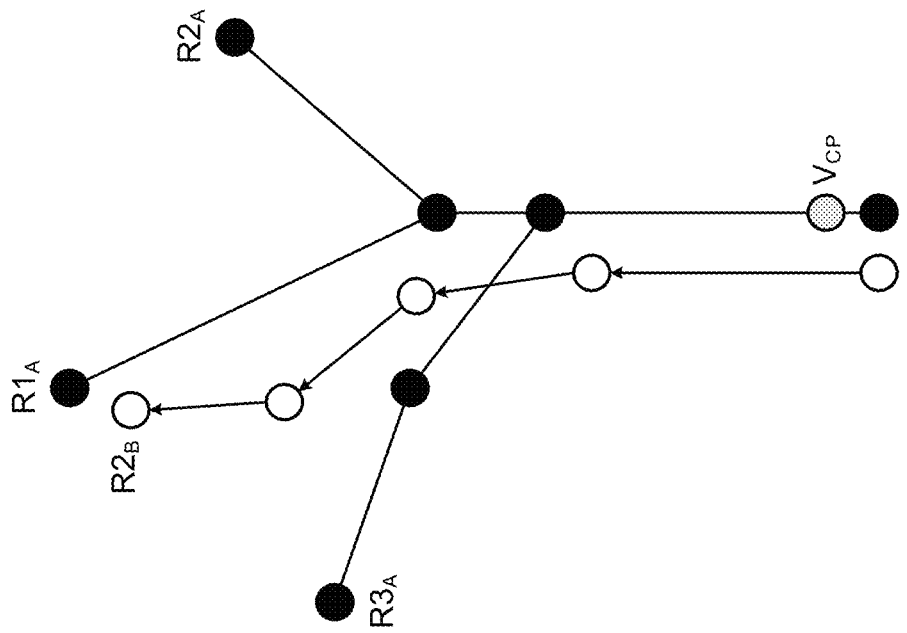
FIG. 2B Discontinuity
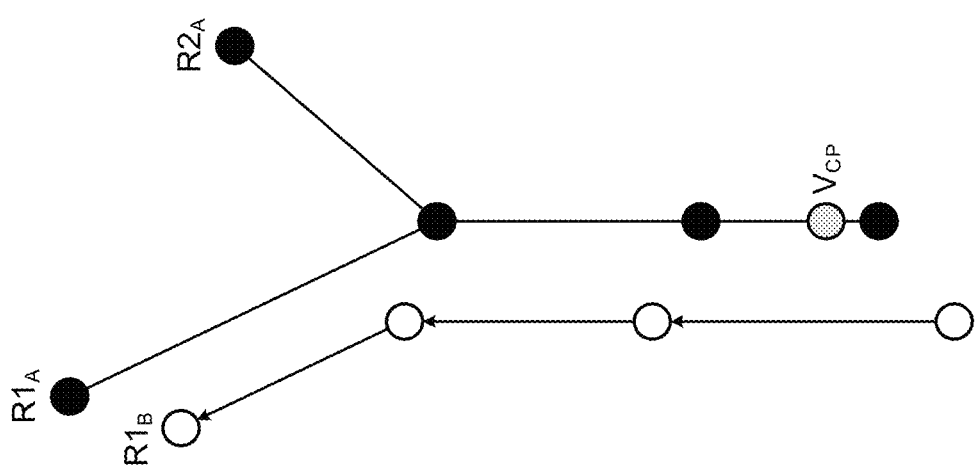
FIG. 2A Misalignment Route Selecting Route Providing

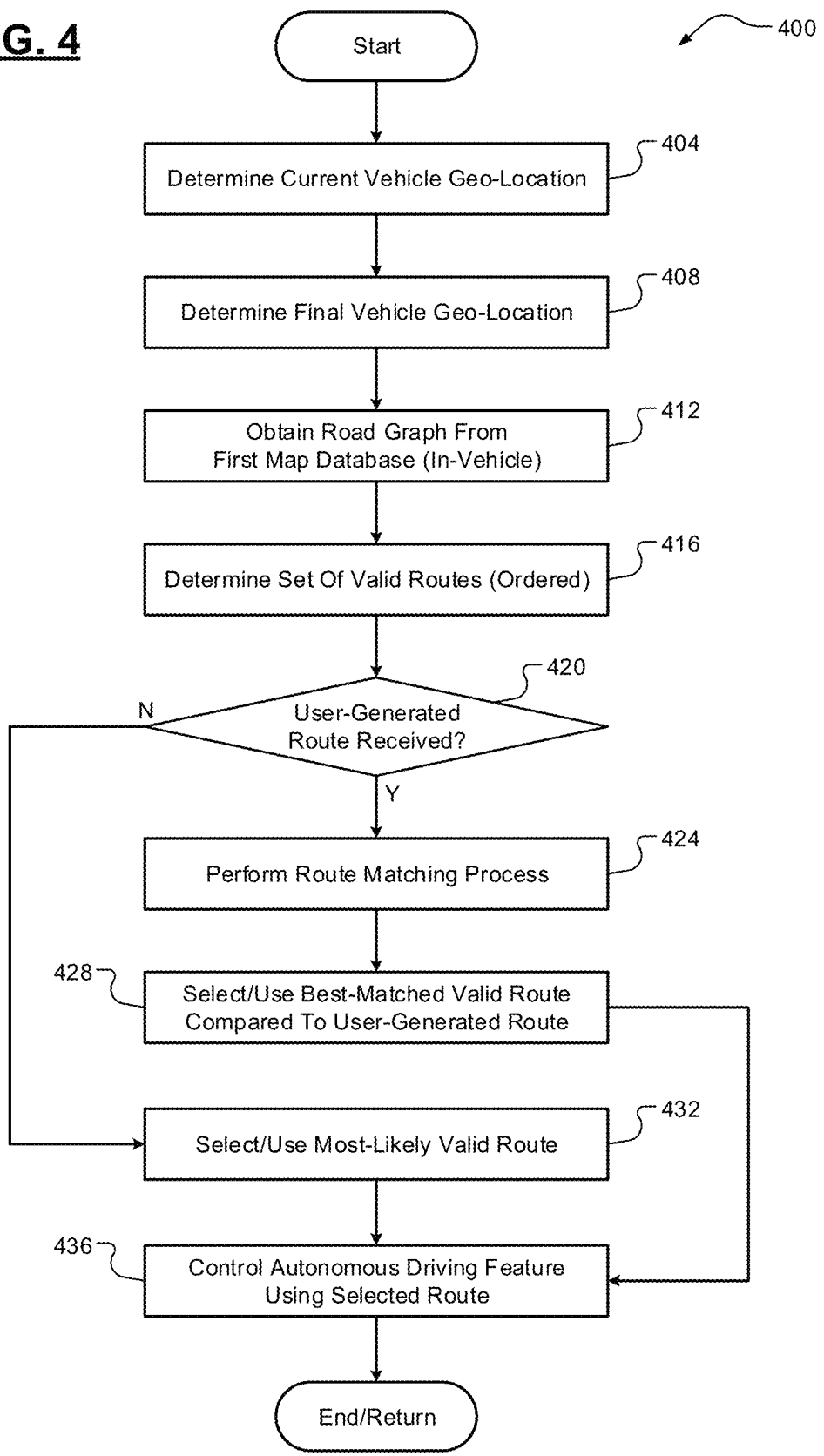

ROUTE PROVISIONING THROUGH MAP MATCHING FOR AUTONOMOUS DRIVING

FIELD

The present application generally relates to vehicle autonomous driving and, more particularly, to techniques for route provisioning for a vehicle autonomous driving feature through map matching.

BACKGROUND

Some vehicle autonomous driving features utilize a specified route to a final destination (e.g., a geo-location) as one input. The vehicle could then control various autonomous driving features (acceleration/braking, steering, etc.) based on this specified route. There are often instances where vehicle routes are generated using a different map database than a map database accessible by the vehicle. A "map database" is defined and referred to herein as stored knowledge of the forms of way the vehicle may take and their relevant attributes. This includes but is not limited to knowledge of exits, speed limits, curvatures, lane count, and associated to their respective location in the world. Differences in this stored knowledge could include, for example, different versions (i.e., different updates) of a single map database or different map databases across different systems (different head units on different vehicles of the same original equipment manufacturer (OEM), third-party map databases, etc.). When map databases differ, there is the potential for map mismatches, which could negatively impact vehicle route provisioning. For example, if a desired vehicle route does not match a valid route according to the vehicle's map database, the desired route could be deemed invalid and thus could be unusable for safety reasons. This could require driver intervention or modification of the desired vehicle route, which could be undesirable. Accordingly, while these conventional map databases and route provisioning systems do work for their intended purpose, there exists an opportunity for improvement in the relevant art.

SUMMARY

According to one example aspect of the invention, a route provisioning system for an autonomous driving feature of a vehicle is presented. In one exemplary implementation, the route provisioning system comprises a geo-location system configured to monitor a current geo-location of the vehicle, a first map database configured to store a road graph specifying nodes and links representative of a map of roads proximate to the vehicle, and a controller configured to receive a user-generated route, the user-generated route having been generated by a user using a second map database that differs from the first map database and specifying an array of geo-points between the current geo-location and a final geo-location for the vehicle, determine, using the road graph maintained by the first map database, a set of valid routes from the current geo-location to the final geo-location ordered based on relative likelihood, determine a best route from the set of valid routes based on a weighted comparison between each route of the set of valid routes and the user-generated route, and utilize the selected route for control of the autonomous driving feature.

In some implementations, the controller is configured to determine the set of valid routes and the order further based on a non-linear cost function and a bounding cost threshold to limit the set of valid routes. In some implementations, the non-linear cost function factors distance traveled and a set of road attributes. In some implementations, the set of road attributes includes at least one of road class, road curvature/straightness, road ramp type.

In some implementations, the controller is configured to determine the best route from the set of valid routes based on weighted Euclidean distance comparisons between geo-points of the user-generated route to geo-points of each route of the set of valid routes. In some implementations, the controller is further configured to, when the user-generated route is not received or the user-generated route is determined to be unusable, determine a highest ordered route from the set of valid routes to be the best route.

In some implementations, the second map database is a different version of a same map database. In some implementations, the vehicle is manufactured by an original equipment manufacturer (OEM), and the second map database is generated by a different OEM map system than the first map system associated with the vehicle. In some implementations, the second map database is a third-party map database.

According to another example aspect of the invention, a route provisioning method for an autonomous driving feature of a vehicle is presented. In one exemplary implementation, the method comprises monitoring, by a geo-location system of the vehicle, a current geo-location of the vehicle, maintaining, by a first map database of the vehicle, a road graph specifying nodes and links representative of a map of roads proximate to the vehicle, receiving, by a controller of the vehicle, a user-generated route, the user-generated route having been generated by a user using a second map database that differs from the first map database and specifying an array of geo-points between the current geo-location and a final geo-location for the vehicle, determining, by the controller and using the road graph maintained by the first map database, a set of valid routes from the current geo-location to the final geo-location ordered based on relative likelihood, determining, by the controller, a best route from the set of valid routes based on a weighted comparison between each route of the set of valid routes and the user-generated route, and utilizing, by the controller, the selected route for control of the autonomous driving feature.

In some implementations, the determining of the set of valid routes and the order is further based on a non-linear cost function and a bounding cost threshold to limit the set of valid routes. In some implementations, the non-linear cost function factors distance traveled and a set of road attributes. In some implementations, the set of road attributes includes at least one of road class, road curvature/straightness, road ramp type.

In some implementations, the determining of the best route from the set of valid routes is based on weighted Euclidean distance comparisons between geo-points of the user-generated route to geo-points of each route of the set of valid routes. In some implementations, the method further comprises, when the user-generated route is not received or the user-generated route is determined to be unusable, determining, by the controller, a highest ordered route from the set of valid routes to be the best route.

In some implementations, the second map database is a different version of a same map database. In some implementations, the vehicle is manufactured by an OEM, and the second map database is generated by a different OEM map system than the first map system associated with the vehicle. In some implementations, the second map database is a third-party map database.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIGS. 2A-2C illustrate example road graphs and routes provided by two different map databases where misalignment, discontinuity, and invalid routes occur according to the principles of the present application;

FIG. 4 is a flow diagram of an example route provisioning method for an autonomous driving feature of a vehicle according to the principles of the present application.

DESCRIPTION

As previously discussed, conventional vehicle route provisioning systems are susceptible to mismatched map databases, which could result in invalid routes that could be unusable for safety reasons. Accordingly, improved vehicle route provisioning systems and methods that perform map matching are presented. These systems and methods handle route provisioning across different map databases in two steps: (1) route providing and (2) route selecting. The route providing step (1) involves continuously creating a set of valid routes from the vehicle's current position to a final/target position. These valid routes are bounded by a cost function to limit the set of valid routes to a reasonable number. Next, the route selecting step (2) involves choosing a best route of the set of valid routes using a weighting function for similarity to the user-defined route (i.e., the original input). This generally involves Euclidean distance-based comparisons of road graph nodes, but also takes into account a plurality of other factors (speed limit, lane marking types, roadway types, grade, etc.). This best-matched route is selected as the route that is then utilized for vehicle routing via an autonomous driving feature.

Figure 1:
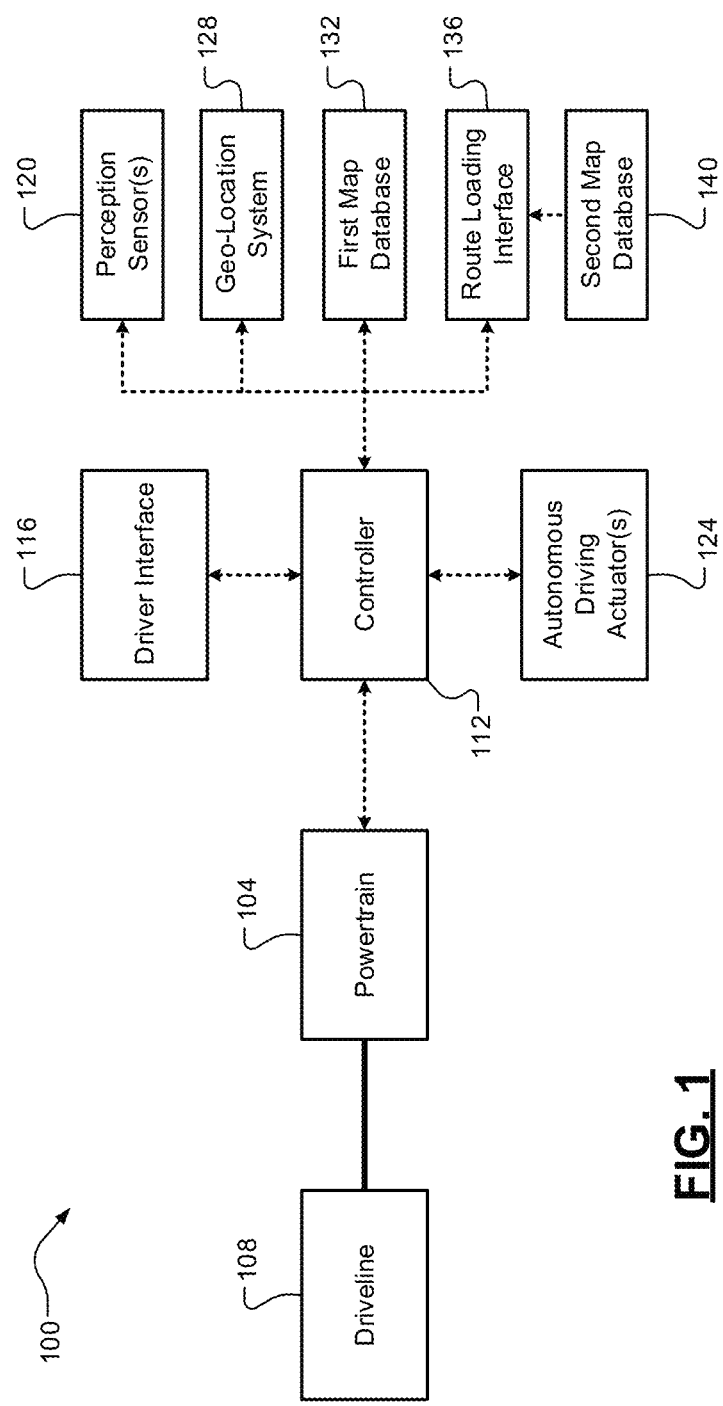
FIG. 1 is a functional block diagram of an example vehicle having a route provisioning system for an autonomous driving feature according to the principles of the present application.

Referring now to FIG. 1, a functional block diagram of an example vehicle 100 having a route provisioning system with map matching according to some implementations of the present application is illustrated. The vehicle 100 includes a powertrain 104 (e.g., an engine, an electric motor, or a combination thereof, and a transmission) configured to generate and transfer drive torque to a driveline 108 for propulsion of the vehicle 100. A controller 112 controls operation of the vehicle 100, which primarily includes controlling the powertrain 104 to generate a desired amount of drive torque (e.g., based on a driver torque request, such as an accelerator pedal input received via a driver interface 116). The controller 112 is also configured to control at least one autonomous driving feature of the vehicle 100. This could include, for example, utilizing inputs from a set of perception sensors 120 (RADAR, LIDAR, cameras, etc.) to control a set of autonomous driving actuators 124 (steering, acceleration/braking, etc.). The autonomous driving feature(s) could range from low-level (L1) autonomous driving where the driver is fully or heavily involved in the operation of the vehicle 100 to high-level (L4-L5) autonomous driving where the driver is not involved or has very little involvement in the operation of the vehicle 100.

The vehicle 100 further comprises a geo-location system 128, a first map database 132, and a route loading interface 136 configured to load a user-generated route (generated using a different second map database 140) into the vehicle 100 (i.e., into a memory of the controller 112). The geo-location system 128 could be, for example only, a global navigation satellite system (GNSS) transceiver configured to determine coordinates (latitude/longitude) indicative of a current position of the vehicle 100. The first map database 132 is an in-vehicle map database (e.g., a high-definition (HD) map database). The first map database 132 generally maintains and outputs (e.g., for display or other usage) a road graph indicative of roads nearby the vehicle 100. The road graph generally comprises nodes (geo-points) and segments connecting certain pairs of nodes, and the segments can have various attributes (road class, direction of travel, curvature/straightness, etc.), which will be discussed in greater detail below. The second map database 140 differs from the first map database 132. The second map database 140, for example, could be a different version of a same map database (an earlier or later update, a different quality level, such as standard definition (SD), or the like) or could be an entirely different map system (e.g., a different map system but from a same original equipment manufacturer (OEM) or a third-party map system).

Referring now to FIGS. 2A-2C, examples of road graphs and routes as provided by two different map databases where misalignment, discontinuity, and invalid routes occur are illustrated. In FIG. 2A, a misalignment example is illustrated. Routes $R1_A$ and $R2_A$ represent two different possible valid routes provided by one map database (map database A) where some nodes/segments are shared. Route $R1_B$ represents a user-generated route provided by another map database (map database B). As can be seen, route $R1_B$ appears to correspond to possible valid route $R1_A$ but is slightly misaligned. In FIG. 2B, a discontinuity example is illustrated. In this example, a third different possible valid route $R3_A$ provided by map database A is shown in an attempt to match to the user-generated route $R2_B$ provided by map database B. As can be seen, user-generated route $R2_B$ is discontinuous in that it doesn't directly follow or correlate to any of the possible valid routes $R1_A$-$R3_A$ provided by map database A. Lastly, in FIG. 2C, an invalid route example is illustrated. User-generated route $R3_B$ is provided by map database B but, as can be seen, it is determined to be invalid as it is not remotely similar to the possible valid routes $R1_A$, $R2_A$ provided by map database A. The route providing and route selection steps performed by the route provisioning systems and methods of the present application will now be described in greater detail.

Figure 3B:
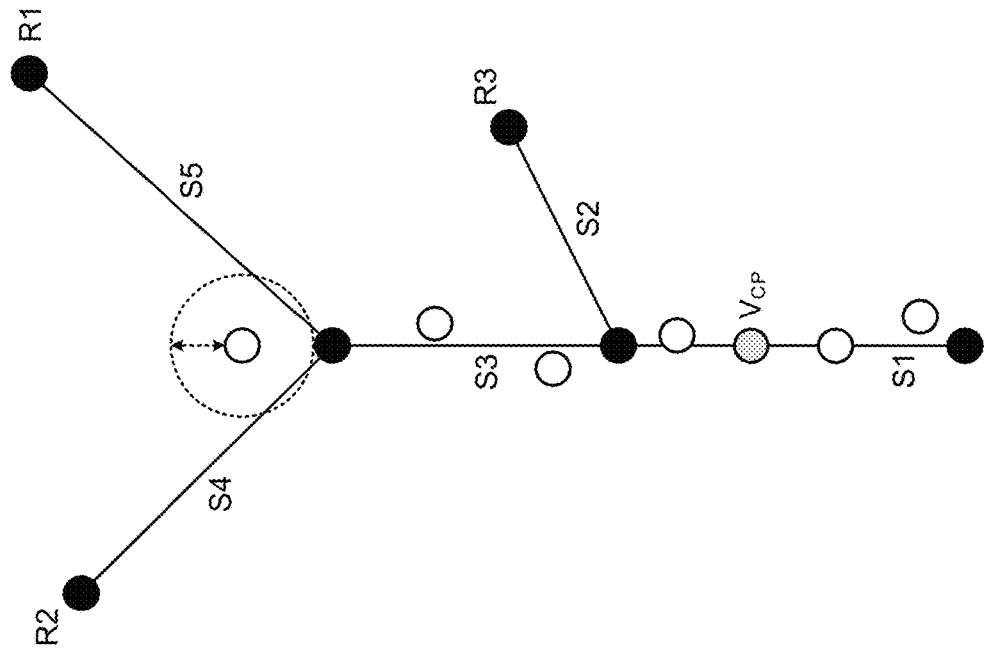
FIGS. 3A-3B illustrate example road graphs and routes provided by two different map databases and the route providing and Euclidean distance-based route selection steps according to the principles of the present application.
Figure 3A:
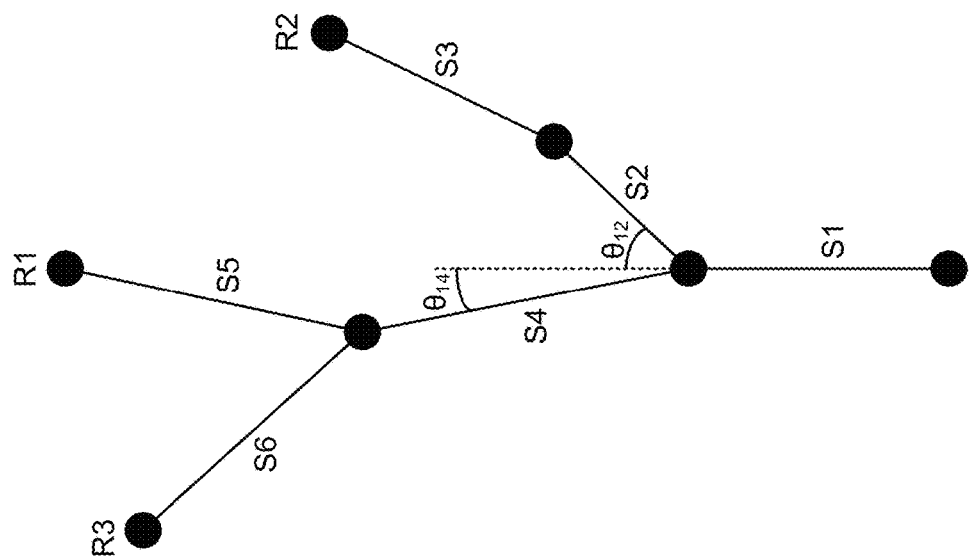

Referring now to FIGS. 3A-3B, example road graphs and routes provided by two different map databases and the route providing and Euclidean distance-based route selection steps according to the principles of the present application are illustrated. In FIG. 3A, an example of the route providing process is illustrated. In general, the set of valid routes includes all possible valid segments (not-to-node connections) that allow the vehicle 100 to travel from its current geo-location to the final geo-location. As can be appreciated, this could be an extremely large set of valid routes, and thus bounding criteria are applied such that only the best subset of all valid routes are identified as part of the set of valid routes. This could include, for example, applying a non-linear cost function and a bounding cost threshold to limit all valid routes to the set of valid routes. This non-linear cost function could also be utilized to order the set of valid routes (e.g., from least-likely to most-likely).

In other words, a lowest cost route could be the most-likely valid route. In one exemplary implementation, the non-linear cost function factors distance traveled (via all of the respective road segments) and a set of road attributes. Non-limiting examples of the set of road attributes include road class (highway/freeway, multi-lane roadway, two-lane roadway, etc.), road curvature/straightness, and road ramp type (e.g., controlled-access with on/off-ramps). As shown, three valid routes are identified (R1, R2, and R3). It is initially determined that routes R1 and R2 are more-likely than route R3 (e.g., because endpoints of segments S5 and S3 are closer to the final geo-location). It is then determined that route R1 (S→S4→S5) is more-likely than route R2 (S1→S2→S3) because the straightness of segment S4 is more similar to segment S1 and segment S2 (i.e., angle $\theta_{12}$ is greater or more drastic than angle $\theta_{14}$). Thus, route R1 is identified as the most-likely route or most probable path (MPP) followed by route R2 and then route R3.

In FIG. 3B, an example of the route selecting process is illustrated. In general, the route selecting process will be based primarily on weighted Euclidean distance comparisons between geo-points of each valid route to the user-generated route. There are also other factors that could be taken into account. As shown, the user-generated route is represented as an array of geo-points (hollow circles) and the set of valid routes is shown to include valid routes R1 (S1→S3→S5), R2 (S1→S3→S4) and R3 (S1→S2). The current vehicle position (Vcp) is also illustrated relative to the geo-points of the various road graphs/routes. As can be seen, valid routes R1 and R2 are better matched to the user-generated route than valid route R3. In the illustrated example of FIG. 3B, the final (upper-most) geo-point of the user-generated route undergoes a weighted Euclidean distance-based comparison to the geo-points (nodes) or segments of the valid routes R1 and R2. There could be, for example, a radius of acceptance that corresponds to or provides a region of acceptance as illustrated. As shown, both segment S4 of valid route R2 and segment S5 of valid route R1 are shown to be within this region of acceptance. Therefore, other criteria or factors could be examined as part of the weighting process to determine which of valid routes R1 and R2 is a best-matched route to the user-generated route. Non-limiting examples of these other factors include road speed limit, road lane marking types, roadway types, and road grade. For example, matches between these parameters and parameters of the user-generated route could be indicative of a better-matched route. Alternatively, certain parameters may be user-preferable or default-preferable, such as higher speed limits (e.g., faster route to final geo-location), highways/freeways, and flatter or less graded roads (e.g., better fuel economy).

Referring now to FIG. 4, a flow diagram of an example route provisioning method 400 with map matching according to some implementations of the present application is illustrated. While the components of vehicle 100 will be specifically references for purposes of this application, it will be appreciated that this method 400 could be applicable to other suitable vehicles. At 404, the controller 112 determines the current location of the vehicle 100 using the geo-location system 128. At 408, the controller 112 determines the final geo-location for the vehicle 100. This could be specified by the user-generated route (if provided) or could otherwise be specified by the driver (e.g., via in-vehicle inputs). At 412, the controller 112 obtains the road graph from the first map database 132. At 416, the controller 112 determines the set of valid routes (e.g., bounded and ordered) from the current vehicle geo-location to the final vehicle geo-location. At 420, the controller 112 determines whether the user-generated route was ever received. This step could also include determining whether the user-generated route is of such poor quality that is can be readily determined to be invalid or unusable.

When false, the method 400 proceeds to 432 where the most-likely valid route of the set of valid routes is selected (i.e., without regard to any user-generated route) and the method 400 then proceeds to 436. When true, however, the method 400 proceeds to 424. At 424, the controller 112 performs the route matching process of the present application. At 428, the controller 112 selects the best-matched valid route of the set of valid routes compared to the user-generated route and the method 400 proceeds to 436. At 436, the controller 112 controls an autonomous driving feature of the vehicle 100 using the selected valid route from the set of valid routes and the method 400 ends or returns to 404 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A route provisioning system for an autonomous driving feature of a vehicle, the route provisioning system comprising:
   a geo-location system configured to monitor a current geo-location of the vehicle;
   a first map database configured to store a road graph specifying nodes and links representative of a map of roads proximate to the vehicle; and
   a controller configured to:
     receive a user-generated route, the user-generated route having been generated by a user using a second map database that differs from the first map database and specifying an array of geo-points between the current geo-location and a final geo-location for the vehicle;
     determine, using the road graph maintained by the first map database, a set of valid routes from the current geo-location to the final geo-location each having a likelihood score satisfying a likelihood threshold, the set of valid routes being ordered from highest to lowest likelihood score;

determine a weighted comparison between each route of the set of valid routes and the user-generated route; and utilize a particular route from the set of valid routes having a highest weighted comparison to the user-generated route for control of the autonomous driving feature.

2. The route provisioning system of claim 1, wherein the controller is configured to determine the set of valid routes and the order further based on a non-linear cost function and a bounding cost threshold to limit the set of valid routes.

3. The route provisioning system of claim 2, wherein the non-linear cost function factors distance traveled and a set of road attributes.

4. The route provisioning system of claim 3, wherein the set of road attributes includes at least one of road class, road curvature/straightness, road ramp type.

5. The route provisioning system of claim 1, wherein the controller is configured to determine the weighted comparisons as weighted Euclidean distance comparisons between geo-points of the user-generated route to geo-points of each route of the set of valid routes.

6. The route provisioning system of claim 1, wherein the controller is further configured to:
when the user-generated route is not received or the user-generated route is determined to be unusable, determine a highest ordered route from the set of valid routes to be the best route.

7. The route provisioning system of claim 1, wherein the second map database is a different version of a same map database.

8. The route provisioning system of claim 1, wherein the vehicle is manufactured by an original equipment manufacturer (OEM), and wherein the second map database is generated by a different OEM map system than the first map system associated with the vehicle.

9. The route provisioning system of claim 1, wherein the second map database is a third-party map database.

10. A route provisioning method for an autonomous driving feature of a vehicle, the method comprising:
monitoring, by a geo-location system of the vehicle, a current geo-location of the vehicle;
maintaining, by a first map database of the vehicle, a road graph specifying nodes and links representative of a map of roads proximate to the vehicle;
receiving, by a controller of the vehicle, a user-generated route, the user-generated route having been generated by a user using a second map database that differs from the first map database and specifying an array of geo-points between the current geo-location and a final geo-location for the vehicle;
determining, by the controller and using the road graph maintained by the first map database, a set of valid routes from the current geo-location to the final geo-location each having a likelihood score satisfying a likelihood threshold, the set of valid routes being ordered from highest to lowest likelihood score;
determining, by the controller, a weighted comparison between each route of the set of valid routes and the user-generated route; and
utilizing, by the controller, a particular route from the set of valid routes having a highest weighted comparison to the user-generated route for control of the autonomous driving feature.

11. The method of claim 10, wherein the determining of the set of valid routes and the order is further based on a non-linear cost function and a bounding cost threshold to limit the set of valid routes.

12. The method of claim 11, wherein the non-linear cost function factors distance traveled and a set of road attributes.

13. The method of claim 12, wherein the set of road attributes includes at least one of road class, road curvature/straightness, road ramp type.

14. The method of claim 10, wherein the determining the weighted comparisons includes determining weighted Euclidean distance comparisons between geo-points of the user-generated route to geo-points of each route of the set of valid routes.

15. The method of claim 10, further comprising when the user-generated route is not received or the user-generated route is determined to be unusable, determining, by the controller, a highest ordered route from the set of valid routes to be the best route.

16. The method of claim 10, wherein the second map database is a different version of a same map database.

17. The method of claim 10, wherein the vehicle is manufactured by an original equipment manufacturer (OEM), and wherein the second map database is generated by a different OEM map system than the first map system associated with the vehicle.

18. The method of claim 10, wherein the second map database is a third-party map database.

19. A route provisioning system for an autonomous driving feature of a vehicle, the route provisioning system comprising:
a geo-location system configured to monitor a current geo-location of the vehicle;
a first map database configured to store a road graph specifying nodes and links representative of a map of roads proximate to the vehicle; and
a controller configured to:
receive a user-generated route, the user-generated route having been generated by a user using a second map database that differs from the first map database and specifying an array of geo-points between the current geo-location and a final geo-location for the vehicle;
determine, using the road graph maintained by the first map database, a set of valid routes from the current geo-location to the final geo-location each having a likelihood score satisfying a likelihood threshold, the set of valid routes being ordered from highest to lowest likelihood score, wherein the set of valid routes and the order are determined further based on a non-linear cost function and a bounding cost threshold to limit the set of valid routes, and wherein the non-linear cost function factors distance traveled and a set of road attributes;
determine a weighted comparison between each route of the set of valid routes and the user-generated route; and
utilize a particular route from the set of valid routes having a highest weighted comparison to the user-generated route for control of the autonomous driving feature.

20. The route provisioning system of claim 19, wherein the set of road attributes includes at least one of road class, road curvature/straightness, road ramp type.

* * * * *